United States Patent Office 3,440,179
Patented Apr. 22, 1969

3,440,179
THREE-COMPONENT CATALYTIC SYSTEM INCLUDING A TETRASUBSTITUTED HYDROCARBYL SILANE, AND METHOD FOR THE POLYMERIZATION OF OLEFINS
John W. Bayer, Perrysburg, and Edgardo Santiago, Toledo, Ohio, assignors to Owens-Illinois, Inc., a corporation of Ohio
No Drawing. Filed Sept. 12, 1963, Ser. No. 308,357
Int. Cl. B01j 11/84
U.S. Cl. 252—429                                    4 Claims

ABSTRACT OF THE DISCLOSURE

A three component catalytic system for the polymerization of olefins which contains: (a) $VCl_3$ or certain titanium halides; (b) certain organoaluminum compounds; (c) an organosilane which contains four hydrocarbon radicals linked directly to a silicon atom.

---

The present invention relates to a catalyst and method for polymerization of olefins. In particular, this invention relates to a polymerization catalyst which comprises a Ziegler catalyst system plus an organosilane in which all the silicon bonds are satisfied with hydrocarbon radicals, and to the method of polymerization with this catalyst.

The addition of triethylaluminum to a heptane solution of titanium tetrachloride causes formation of a brown-black precipitate which consists mainly of reduced titanium chlorides; the precipitate and supernate catalyze the low pressure polymerization of many alpha-olefins. This important discovery by Karl Ziegler was reported in Belgian Patent 533,362 (1954), which disclosed catalysts prepared by interaction of a trialkylaluminum with a compound of a metal from group IVB, VB, or VIB of the Periodic Table, including thorium and uranium. The basic Ziegler method was subsequently expanded by many workers, particularly Natta et al., to include preparation of highly linear and often stereoregular polymers of high molecular weight from a wide variety of alpha-olefins. Application of these processes to monosubstituted ethylenes provides polymers which possess tertiary asymmetric carbon atoms. If these asymmetric centers have the same steric configuration, at least for long portions of the chain, the polymer is said to be isotactic; if the asymmetric carbon atoms alternate in configuration, the polymer is syndiotactic; and if the asymmetric arrangement is random, the polymer is atactic. The terms Ziegler catalyst and Ziegler process are applied generically to compositions and procedures which broadly resemble those discovered by Ziegler. The reported variations of the basic concept are too diverse to be susceptible of concist summary, but the majority of important Ziegler catalysts are encompassed in the definition of a catalyst system which contains (a) a compound, usually a halide or ester, of a transition metal from group IV, V, or VI of the Periodic Chart, and (b) a compound of the formula $RMX_y$, where R represents an aryl or alkyl radical, M represents a metal atom from group I, II, or III, X represents a halogen atom or an alkoxy radical, and y represents an integer less than the oxidation state of M. We have now discovered that addition of an organosilane which contains four hydrocarbon radicals linked directly to a silicon atom to these conventional Ziegler systems provides compositions with excellent and often improved catalytic properties.

It is therefore an object of the present invention to provide a new catalyst for olefin polymerization.

It is another object of this invention to provide a catalyst system of the Ziegler type in which the usual metal alkyl is partially substituted by an organosilane which contains four hydrocarbon radicals linked directly to a silicon atom.

It is a further object of this invention to provide a catalyst system of the Ziegler type which comprises the usual components of Ziegler catalysts and an organosilane which contains four hydrocarbon radicals linked directly to a silicon atom.

It is still a further object of this invention to provide a method for polymerization of olefins by means of a new and novel catalyst system.

These and other objects and advantages of the present invention will be apparent from the following disclosure and claims.

According to the present invention there is provided a catalyst system which comprises: (A) a compound selected from the group which consists of $VCl_3$ and $TiX_n$, where X represents a halogen atom with atomic number greater than 16, and $n$ is 2, 3, or 4; (B) a compound of the formula

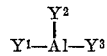

where $Y^1$ represents a radical selected from the group which consists of alkyl radicals with less than five carbon atoms and the phenyl radical, $Y^2$ represents a radical selected from the group which consists of alkyl radicals with less than five carbon atoms, the phenyl radical, a chlorine atom, and a bromine atom, and $Y^3$ represents a radical selected from the group which consists of alkyl radicals with less than five carbon atoms, the phenyl radical, a chlorine atom, and a bromine atom; and (C) a compound of the formula

where each of $Z^1$ and $Z^2$ represents a radical independently selected from the group which consists of alkyl radicals with less than five carbon atoms and alkenyl radicals with less than ten carbon atoms; $Z^3$ represents a radical selected from the group which consists of alkyl radicals with less than five carbon atoms, alkenyl radicals with less than ten carbon atoms, and aryl radicals with less than ten carbon atoms; and $Z^4$ represents a radical selected from the group which consists of alkyl radicals with less than five carbon atoms, alkenyl radicals with less than ten carbon atoms, aryl radicals with less than ten carbon atoms, and aralkyl radicals with less than twenty carbon atoms. A further aspect of this invention provides a method for polymerization which comprises contacting an olefin with a catalyst system of the type just described.

Examples of compounds of the formula $TiX_n$, as defined above are titanium dichloride, titanium trichloride, titanium tetrachloride, titanium tribromide, titanium tetrabromide, titanium triiodide, and titanium tetraiodide.

In the definition of a compound of the formula $AlY^1Y^2Y^3$ above (hereafter referred to generically as $AlY_3$), the term alkyl radical with less than five carbon atoms refers to a radical whose formula can be derived by omitting the symbol for one hydrogen atom from the formula for a saturated, acyclic hydrocarbon which contains from one to four carbon atoms. Examples of compounds of the formula $AlY_3$ so defined are trimethylaluminum, methylaluminum dibromide, triethylaluminum, diethylaluminum chloride, tri-n-propylaluminum, n-propylaluminum dibromide, triisopropylaluminum, diisopropylaluminum chloride, tri-n-butylaluminum, n-butylaluminum dichloride, triphenylaluminum, diphenylaluminum bromide, phenylmethylaluminum chloride, and phenylethylaluminum bromide.

In the definition of a compound of the formula SiZ¹Z²Z³Z⁴ above (hereafter referred to generically as SiZ₄), the term alkyl radical with less than five carbon atoms is as previously defined. The term alkenyl radical with less than ten carbon atoms refers to a radical whose formula can be derived by omitting the symbol for one hydrogen atom from the formula for a mono-unsaturated, acyclic hydrocarbon which contains from one to nine carbon atoms. Examples are the vinyl, allyl, propenyl, isobutenyl, 3-butenyl, 4-pentenyl, 5-hexenyl, 3-heptenyl, 4-octenyl, and 5-nonenyl radicals. Aryl radicals with less than ten carbon atoms referred to above indicate radicals which contain only carbon and hydrogen atoms, for example, the phenyl, 2-methylphenyl, 3-methylphenyl, 4-methylphenyl, 2,4 - dimethylphenyl, and 2,4,6-trimethylphenyl radicals. Aralkyl radicals with less than twenty carbon atoms referred to above indicate radicals which contain only carbon and hydrogen atoms, for example, benzyl, 1-phenylethyl, 2-phenylethyl, 2-methylbenzyl, 4-methylbenzyl, 2,4-dimethylbenzyl, diphenylmethyl, and triphenylmethyl radicals. The tetra-substituted silanes of the present invention therefore include tetramethylsilane,
tetraethylsilane,
vinyltrimethylsilane,
divinyldimethylsilane,
divinyldiethylsilane,
trivinylmethylsilane,
tetravinylsilane,
allyltriethylsilane,
diallyldimethylsilane,
vinylallylmethylethylsilane,
triallylethylsilane,
tetraallylsilane,
di(3-butenyl)dimethylsilane,
4-pentenyltrimethylsilane,
tri(5-hexenyl)methylsilane,
benzyltrimethylsilane,
diphenyldimethylsilane,
triphenylethylsilane,
di(2,4-dimethylphenyl)dimethylsilane,
(2,4,6-trimethylphenyl)triallylsilane,
diphenylmethyldivinylsilane,
and triphenylmethyltrimethylsilane.

In a usual embodiment of this invention there is provided a catalyst system which comprises: (a) a compound of the formula TiX$_n$ as previously defined; (b) a compound of the formula

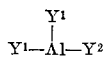

where each Y¹ and Y² independently has the meaning already assigned; and (c) a compound of the formula

where each Z¹ and Z³ independently has the meaning already assigned. A further usual aspect provides a method for polymerization which comprises contacting an alpha-olefin with a catalyst system of the type just described in a hydrocarbon medium.

In a preferred embodiment of the present invention, there is provided a catalyst system which comprises: (A) a compound of the formula TiX$_n$ as previously defined; (B) a compound of the formula

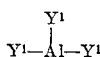

where each Y¹ independently has the meaning already assigned; and (C) a compound of the formula

where each Z¹ independently has the meaning already assigned. A further preferred aspect provides a method for polymerization which comprises contacting an alpha-olefin with a catalyst system of the type just described in a hydrocarbon medium.

In a particularly preferred embodiment of this invention, there is provided a catalyst system which comprises: (A) a compound of the formula TiX$_n$ as previously defined; (B) a compound of the formula

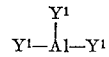

where each Y¹ independently has the meaning already assigned; and (C) a compound of the formula $$(CH_2=CHCH_2)_aSi(CH_3)_b$$

where $a$ and $b$ are integers excluding zero whose sum is four. A further particularly preferred aspect provides a method for polymerization which comprises contacting ethylene or propylene with a catalyst system of the type just described in heptane at a temperature above room temperature and below the boiling point of the reaction mixture at atmospheric pressure.

It is also within the purview of this invention to add a Lewis acid, particularly aluminum chloride, to the polymerization medium to increase the effectiveness of the catalyst system, and to provide two or more olefinic monomers in order to obtain copolymers.

Materials which are polymerized in accordance with the present invention are, broadly, organic monomers which contain an ethylenic linkage. The method of this invention is especially useful when applied to olefins which contain at least one terminal double bond. The olefinic hydrocarbons most preferred are 1-monoolefins which contain from two to ten carbon atoms per molecule. In particular, ethylene can be rapidly polymerized to a tough, solid polymer upon being contacted with a catalyst of this invention at mild temperatures and low pressure; the resultant products generally have high melting points and high densities. Examples of other suitable olefins are propylene, 1-butene, 1-pentene, 1-hexene, 1-heptene, 1-octene, and 1-decene. Examples of branched chain olefins are 3-methyl-1-butene, 4-methyl-1-pentene, and 4,4-dimethyl-1-pentene. Examples of di- and polyolefins include 1,3-butadiene, 1,5-hexadiene, 1,4-pentadiene, 1,4,7-octatriene, 2 - methyl-1,3-butadiene, 2-methyl-1,3-pentadiene, 2,3-dimethyl - 1,3-pentadiene, 2-methyl-3-ethyl-1,3-pentadiene, and 1,4,6 - trimethyl-1,5-hexadiene. Other olefinic compounds useful in the present process include styrene, alpha-methylstyrene, vinylcyclohexane, cyclopentadiene, allylbenzene, and allylcyclohexane. Examples of non-hydrocarbon monomers include chloroprene, 2-methoxybutadiene, methyl acrylate, methyl methacrylate, vinyl chloride, vinyl acetate, 2-methyl-5-vinylpyridine, 4-vinylpyridine, and 2-vinylpyridine.

Our prior copending application Ser. No. 283,575, filed May 27, 1963, and now U.S. 3,394,117, disclosed a process for olefin polymerization by means of a catalyst which comprises a heavy metal halide and a compound of the formula SiZ₄ as defined above. We have now discovered that a composition of matter comprising compounds of the formula VCl₃ or TiX$_n$, AlY₃, and SiZ₄, as previously defined, are also excellent catalysts for olefin polymerization. We have further discovered that certain of these compositions possess catalytic activity which is unusually enhanced, and provide product polymer in remarkably increased yield.

Thus a further and highly preferred aspect of the present invention provides a catalyst system which consists of (A) a titanium halide of the formula TiX$_n$, as previously defined; (B) an aluminum alkyl selected from the group which consists of triethylaluminum and diethylaluminum chloride; and (C) a tetrasubstituted organosilane selected from the group which consists of n-propyltrimethylsilane, allyltrimethylsilane, 3-butenyltrimethylsilane, 4-pentenyltrimethylsilane, 5-hexenyl trimethylsilane, phenyltrimethylsilane, benzyltrimethylsilane, and triphenylmethyltrimethylsilane. A further highly preferred aspect provides a method for polymerization which comprises contacting an alpha-olefin with a catalyst system of the type just described in a hydrocarbon medium.

Examples 1 to 18 below describe experiments in which the catalyst systems of this invention were used to polymerize alpha-olefins to solid polymers. Examples 19 to 27 are provided to demonstrate the synergistic effect on polymer yield achieved with certain of the catalystic systems of this invention. This is illustrated by comparison of the yields from reactions of three types: (A) a reaction in which a conventional Ziegler system, e.g., $AlY_3$, and $TiX_n$, is used to polymerize an olefin; (B) a reaction in which the $AlY_3$ of the conventional Ziegler system is completely replaced by an equimolar quantity of $SiZ_4$ compound; and (C) a reaction in which part of the $AlY_3$ compound of the conventional Ziegler system is replaced by an equimolar portion of $SiZ_4$ compound. In each instance, it is found that the yield from reaction (C) is greater than that from either (A) or (B), indicating that the effect of partial replacement of $AlY_3$ by $SiZ_4$ is unexpectedly able to increase yield more than additively.

In the experiments which correspond to the following specific examples, normally liquid silanes were commercial materials which were distilled to give a fraction boiling over a temperature range of not more than 3° C. This fraction was then stored under nitrogen in containers equipped with rubber stoppers to allow insertion of a hypodermic needle so that the silanes could be transferred to the reaction mixture by means of a hypodermic syringe.

The titanium trichloride was an anhydrous, purple, crystalline material sealed in 0.2-gram quantities in individual ampules in a nitrogen atmosphere, and was obtained from the Anderson Chemical Division of the Stauffer Chemical Company. The titanium trichloride in the following examples was introduced into the reaction vessel by means which excluded contact with air. The heptane was carefully purified and dried before use, and was transferred to the reaction vessel in a nitrogen atmosphere. High purity ethylene was also employed, and was carefully further purified immediately before use.

The reaction vessel was in each case a 1-liter round bottom flask equipped with a side arm and a thermowell containing a thermocouple attached to an automatic temperature recorder; the flask was mounted in a heating mantle controlled by a variable transformer. The reaction vessel was shaken by means of a mechanical shaker throughout the reaction time. Gaseous monomers were continuously introduced into the reaction vessel so as to maintain pressures in most cases in the range from 20 to 25 p.s.i.g., as indicated in the examples.

The samples of polymer prepared by the methods of the following examples were, after the workup procedure described, dried at 60–70° C. under reduced pressure, and then compression molded into films at 240° C. under a pressure of about 10,000 p.s.i.g. A small portion of a three-mil film thus prepared was placed between glass plates on a Fischer-Johns melting point apparatus, and a melting point was determined. The remainder of the three-mil film was submitted for infrared analysis. A ten-mil film similarly prepared was subjected to a modification of the ASTM 762X60T procedure for determination of density. Densities reported were at 23° C. The solid polymers produced by the method of this invention are useful for making articles such as bottles, bowls, pails, etc. Liquid and soft polymers can be used as rubber plasticizers, plasticizers for organic plastics, as caulking compounds, etc.

These examples are illustrative only, and not to be regarded as limiting the invention.

Example 1

In the reaction vessel of the apparatus previously described were placed 300 ml. of purified heptane, 0.5 gram of titanium trichloride, 0.30 ml. of triethylaluminum, and 0.16 ml. of ethyltrimethylsilane. The mixture thus obtained was heated under a nitrogen atmosphere with shaking to 57° C., whereupon the nitrogen blanket was replaced by ethylene maintained at a pressure of 20 p.s.i.g. The mixture was heated with agitation at about 66° C. for about two hours, and then allowed to cool to about room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° C. under a slightly subatmospheric pressure. The yield was 5.3 grams of polymer melting at 145° C. with a density of 0.955 gram per cubic centimeter. The experiment was repeated, except that 0.15 ml. of triethylaluminum and 0.31 ml. of ethyltrimethylsilane were substituted for the amounts previously cited. The product polymer, after the workup procedure just described, weighed 8.0 grams. It had a melting point of 146° C. and a density of 0.949 gram per cubic centimeter.

Example 2

(A) A catalyst system which consisted of 0.5 gram of titanium trichloride, 0.3 ml. of triethylaluminum, and 0.18 ml. of n-propyltrimethylsilane in 300 ml. of heptane under a nitrogen atmosphere was prepared by the procedure of Example 1, and the nitrogen was then replaced by ethylene at a pressure of 20 p.s.i.g. The reaction mixture thus obtained was shaken at 66° C. for two hours, and the product polymer was subjected to the workup procedure already described. The yield was 33.1 grams of a polymer melting at 140° C. with a density of 0.935 gram per cubic centimeter. The experiment was repeated, except that 0.15 ml. of triethylaluminum and 0.36 ml. of n-propyltrimethylsilane were substituted for the amounts previously cited. The product polymer, after the usual workup procedure, weighed 19.3 grams. It had a melting point of 143° C. and a density of 0.935 gram per cubic centimeter.

(B) By the procedure of Example 1, a catalyst system was prepared from 0.5 gram of titanium trichloride, 0.3 ml. of triethylaluminum, and 0.18 ml. of n-propyltrimethylsilane, and the mixture thus obtained was treated with propylene under a pressure of 20 p.s.i.g. at 66° C. for two hours. After the workup procedure already described, the product weighed 31.0 grams; its melting point was 141° C. and its density was 0.892 gram per cubic centimeter. A second run, using 0.41 ml. of triethylaluminum and 0.36 ml. of n-propyltrimethylsilane in place of the quantities previously described gave the product in a yield of 31.2 grams; its melting point was 144° C., and its density was 0.889 gram per cubic centimeter.

(C) The procedure of Example 1 was repeated, using a catalyst system of 0.6 ml. of titanium tetrachloride, 0.49 ml. of triethylaluminum, and 0.30 ml. of n-propyltrimethylsilane; the monomer was ethylene. The product polymer weighed 13.7 grams; its melting point was 150° C. and its density was 0.952 gram per cubic centimeter. In a second run using 0.25 ml. of triethyl aluminum and 0.060 ml. of n-propyltrimethylsilane, 11.1 grams of polymer was obtained. Its melting point was 135° C. and its density was 0.939 gram per cubic centimeter.

(D) The procedure of Example 1 was repeated, using a catalyst system of 0.6 ml. of titanium tetrachloride, 0.49 ml. of triethylaluminum, and 0.30 ml. of n-propyltrimethylsilane; the monomer was propylene. The product polymer weighed 2.3 grams. Its melting point was 142° C. and its density was 0.889 gram per cubic centimeter. A second run using 0.25 ml. of triethylaluminum and 0.60 ml. of n-propyltrimethylsilane gave similar results.

(E) By the procedure of Example 1, a catalyst system was prepared from 1.0 gram of vanadium trichloride, 0.55 ml. of triethylaluminum, and 0.4 ml. of n-propyltrimethylsilane, and subsequently contacted with ethylene. The product weighed 20.1 grams; its melting point was 197° C. and its density was 0.936 gram per cubic centimeter. A second run using 0.26 ml. of triethylaluminum and 0.8 ml. of n-propyltrimethylsilane gave the product in a yield of 17.8 grams; its melting point was 198° C. and its density was 0.932 gram per cubic centimeter.

Example 3

By the procedure of Example 1, a catalyst system was prepared using 0.6 ml. of titanium tetrachloride, 0.5 ml. of triethylaluminum, and 0.3 ml. of isopropyltrimethylsilane; the monomer was ethylene. The product, after the workup previously described, weighed 14.4 grams. Its melting point was 129° C. and its density was 0.954 gram per cubic centimeter. A second run using 0.25 ml. of triethylaluminum and 0.6 ml. of isopropyltrimethylsilane gave 32.2 grams of polymer. The melting point was 130° C. and the density was 0.949 gram per cubic centimeter.

Example 4

(A) In the reaction vessel of the apparatus previously described were placed 300 ml. of purified heptane, 0.5 gram of titanium trichloride, 0.3 ml. of triethylaluminum, and 0.2 ml. of n-butyltrimethylsilane. The mixture thus obtained was heated under a nitrogen atmosphere with shaking to 57° C., whereupon the nitrogen blanket was replaced by ethylene maintained at a pressure of 20 p.s.i.g. The mixture was heated with agitation at about 66° C. for about two hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. This procedure was repeated, and the polymer was then dried in a vacuum oven at about 62 to 70° C. The product thus obtained weighed 25.3 grams; its melting point was 300° C. and its density was 0.937 gram per cubic centimeter.

(B) The procedure of Example 4A was repeated, using a catalyst system of 0.5 gram of titanium trichloride, 0.3 ml. of triethylaluminum, and 0.2 ml. of n-butyltrimethylsilane; the monomer was propylene. The product polymer, after the workup procedure already described, weighed 50.8 grams; its melting point was 170° C. and its density was 0.892 gram per cubic centimeter. A second run using 0.5 gram of titanium trichloride, 0.14 ml. of triethylaluminum, and 0.4 ml. of n-butyltrimethylsilane gave the polymer in a yield of 44.1 grams. The melting point of the polymer thus obtained was 168° C. and its density was 0.891 gram per cubic centimeter.

(C) By the procedure of Example 4A, a catalyst system was prepared using 0.6 ml. of titanium tetrachloride, 0.49 ml. of triethylaluminum, and 0.3 of n - butyltrimethylsilane. After treatment with ethylene as therein described, a polymer was obtained in a yield of 14.0 grams; its density was 0.950 gram per cubic centimeter, and its melting point was 225° C. In a second run using 0.6 ml. of titanium tetrachloride, 0.25 ml. of triethylaluminum, and 0.6 ml. of n-butyltrimethylsilane, the product polymer weighed 9.5 grams; its melting point was 160° C. and its density was 0.949 gram per cubic centimeter.

(D) The procedure of Example 4A was repeated, using a catalyst system of 0.6 ml. of titanium tetrachloride, 0.5 ml. of triethylaluminum, and 0.3 ml. of n - butyltrimethylsilane, and propylene as the monomer. The product polymer weighed 2.0 grams, and had a melting point of 150° C. and a density of 0.892 gram per cubic centimeter. A second run using 0.6 ml. of titanium tetrachloride, 0.25 ml. of triethylaluminum, and 0.6 ml. of n-butyltrimethylsilane gave similar results.

(E) The procedure of Example 4A was repeated, using a catalyst system of 1.0 gram of vanadium trichloride, 0.55 ml. of triethylaluminum, and 0.4 ml. of n-butyltrimethylsilane; the monomer was ethylene. The product polymer weighed 23.8 grams; its melting point was 195° C. and its density was 0.934 gram per cubic centimeter. A second run using 1.0 gram of vanadium trichloride, 0.26 ml. of triethylaluminum, and 0.8 ml. of n-butyltrimethylsilane gave the product polymer an 10.8-gram yield; the melting point was 193° C. and the density was 0.932 gram per cubic centimeter.

Example 5

(A) By the procedure of Example 1, a catalyst system was prepared from 0.5 gram of titanium trichloride, 0.30 ml. of triethylaluminum, and 0.20 ml. of tetraethylsilane; the monomer was ethylene. The product polymer was obtained in a yield of 19.1 grams. Its melting point was 150° C. and its density was 0.910 gram per cubic centimeter. In a second run using 0.5 gram of titanium trichloride, 0.15 ml. of triethylaluminum, and 0.40 ml. of tetraethylsilane, the yield of polymer was 19.1 grams; its melting point was 162° C. and its density was 0.937 gram per cubic centimeter.

(B) The procedure of Example 1 was repeated, using a catalyst system prepared from 0.6 ml. of titanium tetrachloride, 0.46 ml. of diethylaluminum chloride, and 0.34 ml. of tetraethylsilane; the monomer was propylene. The product, in small yield, was isolated by the procedure previously described.

Example 6

(A) A catalyst system was prepared by the procedure of Example 1, using 0.5 gram of titanium trichloride, 0.3 ml. of triethylaluminum, and 0.2 ml. of vinyltrimethylsilane; the monomer was propylene. The product polymer, isolated by the procedure of the cited example, weighed 31.8 grams; its melting point was 165° C. and its density was 0.889 gram per cubic centimeter. A second run using 0.5 gram of titanium trichloride, 0.15 ml. of triethylaluminum, and 0.4 ml. of vinyltrimethylsilane gave the polymer in a yield of 25.7 grams; the melting point was 162° C. and the density was 0.883 gram per cubic centimeter.

(B) By the procedure of Example 1, a catalyst system was prepared using 0.6 ml. of titanium tetrachloride, 0.5 ml. of triethylaluminum, and 0.5 ml. of vinyltrimethylsilane. The catalyst thus prepared was subsequently contacted with ethylene by the procedure already described, to give a product polymer in a yield of 15.8 grams. A second run using 0.6 ml. of titanium tetrachloride, 0.25 ml. of triethylaluminum, and 0.52 ml. of vinyltrimethylsilane gave the product polymer in a 19.4 gram yield.

Example 7

(A) A catalyst system was prepared from 0.5 gram of titanium trichloride, 0.3 ml. of triethylaluminum, and 0.17 ml. of divinyldimethylsilane by the procedure of Example 1, and subsequently contacted with ethylene by the method therein described to give 5.4 grams of product polymer melting at 145° C. with a density of 0.948 gram per cubic centimeter. A second run using 0.5 gram of titanium trichloride, 0.15 ml. of triethylaluminum, and 0.33 ml. of vinyltrimethylsilane gave the product in a yield of 4.0 grams; the melting point was 146° C. and the density was 0.945 gram per cubic centimeter.

(B) The procedure of Example 1 was repeated, using 0.6 ml. of titanium tetrachloride, 0.46 ml. of diethylaluminum chloride, and 0.28 ml. of divinyldimethylsilane; the monomer was propylene. A small amount of polymeric product was obtained.

Example 8

By the procedure of Example 1, a catalyst system was prepared using 0.5 gram of titanium trichloride, 0.3 ml. of triethylaluminum, and 0.18 ml. of tetravinylsilane. The catalyst thus prepared was contacted with ethylene by the procedure therein described to give 7.8 grams of polymer melting at 144° C. with a density of 0.951 gram per cubic centimeter. A second run using 0.5 gram of titanium trichloride, 0.15 ml. of triethylaluminum, and 0.37 ml. of tetravinylsilane gave the product polymer in a yield of 13.5 grams; its melting point was 142° C. and its density was 0.945 gram per cubic centimeter.

Example 9

(A) In the reaction vessel of the apparatus previously described were placed 300 ml. of purified heptane, 0.5 gram of titanium trichloride, 0.3 ml. of triethylaluminum, and 0.16 ml. of allyltrimethylsilane. The mixture thus obtained was heated under a nitrogen atmosphere with shaking to 57° C. whereupon the nitrogen blanket was replaced by ethylene maintained at a pressure of 20 p.s.i.g. The mixture was heated with agitation at about 66° C. for about two hours, and then allowed to cool to about room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° C. under a slightly subatmospheric pressure. The yield was 26.3 grams of polymer melting at 166° C. with a density of 0.941 gram per cubic centimeter. In a second run using 0.5 gram of titanium trichloride, 0.14 ml. of triethylaluminum, and 0.32 ml. of allyltrimethylsilane, the yield of product polymer was 23.3 grams; the melting point was 172° C. and the density was 0.937 gram per cubic centimeter.

(B) By the procedure of Example 9A, a catalyst system was prepared from 0.5 gram of titanium trichloride, 0.3 ml. of triethylaluminum, and 0.16 ml. of allyltrimethylsilane, and then contacted with propylene maintained at a pressure of about 20 p.s.i.g. The product polymer weighed 43.1 grams, and had a melting point of 156° C. and a density of 0.890 gram per cubic centimeter. In a second run using 0.5 gram of titanium trichloride, 0.14 ml. of triethylaluminum, and 0.32 ml. of allyltrimethylsilane, the product polymer weighed 44.2 grams; its melting point was 161° C. and its density was 0.892 gram per cubic centimeter.

(C) A catalyst system was prepared from 0.5 gram of titanium trichloride, 0.27 ml. of diethylaluminum chloride, and 0.16 ml. of allyltrimethylsilane by the procedure of Example 9A, and subsequently contacted with propylene as therein described. The resultant polymer, after the workup procedure already described, weighed 16.2 grams; its melting point was 133° C. and its density was 0.902 gram per cubic centimeter. In a second run using 0.5 gram of titanium trichloride, 0.13 ml. of diethylaluminum chloride, and 0.32 ml. of allyltrimethylsilane, the product polymer was obtained in a 12.2-gram yield; its melting point was 142° C. and its density was 0.897 gram per cubic centimeter.

(D) By the procedure of Example 9A, a catalyst system was prepared using 0.6 ml. of titanium tetrachloride, 0.49 ml. of triethylaluminum, and 0.16 ml. of allyltrimethylsilane, and then contacted with propylene as therein described. The product polymer had a melting point of 156° C. and a density of 0.890 gram per cubic centimeter; the yield was 2.3 grams.

(E) A catalyst system was prepared by the procedure given in Example 9A, using 0.6 ml. of titanium tetrachloride, 0.46 ml. of diethylaluminum chloride, and 0.16 ml. of allyltrimethylsilane; the monomer used was propylene. The product was obtained in small yield after the workup procedure already described. A second run using 0.6 ml. of titanium tetrachloride, 0.23 ml. of diethylaluminum chloride, and 0.32 ml. of allyltrimethylsilane gave similar results.

(F) By the procedure of Example 9A, a catalyst system was prepared using 1.0 gram of titanium tribromide, 0.32 ml. of triethylaluminum, and 0.11 ml. of allyltrimethylsilane; the monomer was ethylene. The product polymer was obtained in a yield of 11.5 grams; its melting point was 238° C. and its density was 0.934 gram per cubic centimeter. A second run using 1.0 gram of titanium tribromide, 0.16 ml. of triethylaluminum, and 0.22 ml. of allyltrimethylsilane gave the product polymer in a yield of 8.7 grams. The melting point was 240° C. and the density was 0.939 gram per cubic centimeter.

(G) A catalyst system was prepared according to the procedure of Example 9A, using 1.0 gram of vanadium trichloride, 0.55 ml. of triethylaluminum, and 0.20 ml. of allyltrimethylsilane, and then contacted with ethylene as therein described. The product weighed 31.7 grams after the workup procedure therein described, and had a melting point of 240° C. and a density of 0.939 gram per cubic centimeter. A second run using 1.0 gram of vanadium trichloride, 0.26 ml. of triethylaluminum, and 0.39 ml. of allyltrimethylsilane gave the product polymer in a 31.7-gram yield; its melting point was 235° C. and its density was 0.933 gram per cubic centimeter.

(H) By the procedure of Example 9A, a catalyst system was prepared from 1.0 gram of vanadium trichloride, 0.50 ml. of diethylaluminum chloride, and 0.11 ml. of allyltrimethylsilane, and subsequently contacted with propylene. A small amount of polymer was obtained. A second run using 1.0 gram of vanadium trichloride, 0.25 ml. of diethylaluminum chloride, and 0.22 ml. of allyltrimethylsilane gave similar results.

Example 10

(A) By the procedure of Example 1, a catalyst system was prepared from 0.5 gram of titanium trichloride, 0.30 ml. of triethylaluminum, and 0.29 ml. of allyltriisopropylsilane, and then contacted with ethylene at 20 p.s.i.g. The polymeric product weighed 23.5 grams, and had a melting point of 152° C. and a density of 0.943 gram per cubic centimeter. In a second run using 0.5 gram of titanium trichloride, 0.15 ml. of triethylaluminum, and 0.58 ml. of allyltriisopropylsilane, the yield of product polymer was 24.4 grams. Its melting point was 150° C. and its density was 0.939 gram per cubic centimeter.

(B) A catalyst system was prepared according to the procedure of Example 1, using 0.5 gram of titanium trichloride, 0.30 ml. of triethylaluminum, and 0.29 ml. of allyltriisopropylsilane, and subsequently contacted with propylene by the means therein described to give a product polymer in a yield of 39.1 grams; its melting point was 152° C. and its density was 0.892 gram per cubic centimeter. In a second run using 0.5 gram of titanium trichloride, 0.15 ml. of triethylaluminum, and 0.58 ml. of allyltriisopropylsilane, the yield of product polymer was 45.2 grams. Its melting point was 153° C. and its density was 0.906 gram per cubic centimeter.

Example 11

By the procedure of Example 1, a catalyst system was prepared using 0.5 gram of titanium trichloride, 0.3 ml. of triethylaluminum, and 0.20 ml. of diallyldimethylsilane; the monomer was ethylene. The product polymer, after the workup procedure previously described, weighed 11.8 grams; its melting point was 146° C. and its density was 0.895 gram per cubic centimeter. A second run using 0.5 gram of titanium trichloride, 0.15 ml. of triethylaluminum, and 0.39 ml. of diallyldimethylsilane gave the product in a yield of 20.3 grams; its melting point was 150° C. and its density was 0.941 gram per cubic centimeter.

Example 12

(A) A catalyst system was prepared by the procedure of Example 1, using 0.5 gram of titanium trichloride, 0.30 ml. of triethylaluminum, and 0.19 ml. of 3-butenyltrimethylsilane; the monomer was ethylene. The product polymer, after the workup procedure of the cited example, weighed 27.3 grams; its melting point was 156° C. and its density was 0.940 gram per cubic centimeter. In a second run using 0.5 gram of titanium trichloride, 0.15 ml. of triethylaluminum, and 0.38 ml. of 3-butenyltrimethylsilane, the yield of polymer was 27.8 grams; its melting point was 142° C. and its density was 0.933 gram per cubic centimeter.

(B) By the procedure of Example 1, a catalyst system was prepared using 0.5 gram of titanium trichloride, 0.30 ml. of triethylaluminum, and 0.19 ml. of 3-butenyltrimethylsilane, and subsequently contacted with ethylene maintained at a pressure of about 20 p.s.i.g. The product polymer weighed 61.7 grams; its melting point was 156° C. and its density was 0.895 gram per cubic centimeter. In a second run using 0.5 gram of titanium trichloride, 0.15 ml. of triethylaluminum, and 0.38 ml. of 3-butenyltrimethylsilane, the yield of polymer was 16.9 grams; its melting point was 160° C. and its density was 0.899 gram per cubic centimeter.

Example 13

(A) In the reaction vessel of the apparatus previously described were placed 300 ml. of purified heptane, 0.5 gram of titanium trichloride, 0.30 ml. of triethylaluminum, and 0.20 ml. of 4-pentenyltrimethylsilane. The mixture thus obtained was heated under a nitrogen atmosphere with shaking to 57° C. whereupon the nitrogen blanket was replaced by ethylene maintained at a pressure of 20 p.s.i.g. The mixture was heated with agitation at about 66° C. for about two hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° under a slightly subatmospheric pressure. The yield was 28.0 grams of polymer melting at 226° C. with a density of 0.937 gram per cubic centimeter. In a second run using 0.5 gram of titanium trichloride, 0.14 ml. of triethylaluminum, and 0.41 ml. of 4-pentenyltrimethylsilane, the polymer yield was 13.2 grams; its melting point was 228° C. and its density was 0.937 gram per cubic centimeter.

(B) By the procedure of Example 13A, a catalyst system was prepared from 0.5 gram of titanium trichloride, 0.3 ml. of triethylaluminum, and 0.20 ml. of 4-pentenyltrimethylsilane, and then contacted with propylene maintained at a pressure of about 20 p.s.i.g. The product polymer weighed about 62 grams; its melting point was 167° C. and its density was 0.889 gram per cubic centimeter. In a second run using 0.5 gram of titanium trichloride, 0.14 ml. of triethylaluminum, and 0.40 ml. of 4-pentenyltrimethylsilane, the yield of polymer similarly obtained was 56.5 grams; its melting point was 171° C. and its density was 0.890 gram per cubic centimeter.

(C) A catalyst system was prepared by the procedure of Example 13A, using 0.5 gram of titanium trichloride, 0.27 ml. of diethylaluminum chloride, and 0.20 ml. of 4-pentenyltrimethylsilane, and then contacted with proplyene. The product polymer, after the workup procedure of the cited example, weighed 15.5 grams; its melting point was 160° C. and its density was 0.908 gram per cubic centimeter. In a second run using 0.5 gram of titanium trichloride, 0.13 ml. of diethylaluminum chloride, and 0.41 ml. of 4-pentenyltrimethylsilane, the yield of polymer was 12.5 grams. The product thus obtained had a melting point of 165° C. and a density of 0.909 gram per cubic centimeter.

(D) By the procedure of Example 13A, a catalyst composition was prepared using 0.6 ml. of titanium tetrachloride, 0.49 ml. of triethylaluminum, and 0.34 ml. of 4-pentenyltrimethylsilane. The catalyst thus obtained was treated with ethylene at a pressure of about 20 p.s.i.g. as previously described to give 25.3 grams of a polymer which had a melting point of 131° C. and a density of 0.951 gram per cubic centimeter. A second run using 0.6 ml. of titanium tetrachloride, 0.25 ml. of triethylaluminum, and 0.68 ml. of 4-pentenyltrimethylsilane resulted in a yield of 26.7 grams of polymer melting at 128° C. with a density of 0.940 gram per cubic centimeter.

(E) A catalyst system was prepared according to the procedure of Example 13A, using 0.6 ml. of titanium tetrachloride, 0.49 ml. of triethylaluminum, and 0.38 ml. of 4-pentenyltrimethylsilane. The catalyst thus obtained was treated with propylene at a pressure of about 20 p.s.i.g. and under the conditions described in the cited example to give, after the workup procedure therein described, 1.5 grams of a polymer which had a melting point of 147° C. and a density of 0.855 gram per cubic centimeter.

(F) By the procedure of Example 13A, a catalyst was prepared using 1.0 gram of titanium tribromide, 0.32 ml. of triethylaluminum, and 0.22 ml. of 4-pentenyltrimethylsilane, and subsequently contacted with propylene as therein described, to give a small amount of polymeric product. A second run using 1.0 gram of titanium tribromide, 0.16 ml. of triethylaluminum, and 0.44 ml. of 4-pentenyltrimethylsilane gave similar results.

(G) A catalyst was prepared according to the procedure set forth in Example 13A using 1.0 gram of vanadium trichloride, 0.55 ml. of triethylaluminum, and 0.38 ml. of 4-pentenyltrimethylsilane. The catalyst system thus obtained was contacted with ethylene by the procedure of the cited example to give 5.0 grams of polymer melting at 148° C. and with a density of 0.956 gram per cubic centimeter. A second run using 1.0 gram of vanadium trichloride, 0.27 ml. of triethylaluminum, and 0.76 ml. of 4-pentenyltrimethylsilane gave 4.1 grams of polymer melting at 144° C. with a density of 0.945 gram per cubic centimeter.

(H) By the procedure of Example 13A, a catalyst was prepared from 1.0 gram of vanadium trichloride, 0.5 ml. of diethylaluminum chloride, and 0.38 ml. of 4-pentenyltrimethylsilane. The monomer was propylene maintained at a pressure of about 20 p.s.i.g. The product polymer was obtained in small yield. A second run using 1.0 gram of vanadium trichloride, 0.25 ml. of diethylaluminum chloride, and 0.76 ml. of 4-pentenyltrimethylsilane gave similar results.

Example 14.—5-hexenyltrimethylsilane (A) In the reaction vessel of the apparatus previously described were placed 0.5 gram of titanium trichloride, 0.3 ml. of triethylaluminum, and 0.21 ml. of 5-hexenyltrimethylsilane. The mixture thus obtained was heated under a nitrogen atmosphere with shaking to 57° C., whereupon the nitrogen blanket was replaced by ethylene maintained at a pressure of about 20 p.s.i.g. The mixture was heated with agitation at about 66° C. for about two hours, and then allowed to cool to about room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° C. under a slightly subatmospheric pressure. The yield was 30.0 grams of a polymer melting at 226° C. and with a density of 0.943 gram per cubic centimeter. A second run using 0.5 gram of titanium trichloride, 0.14 ml. of triethylaluminum, and 0.43 ml. of 5-hexenyltrimethylsilane gave the product polymer in a yield of 29.3 grams. Its melting point was 231° C. and its density was 0.928 gram per cubic centimeter.

(B) By the procedure of Example 14A, a catalyst system was prepared using 0.5 gram of titanium trichloride, 0.3 ml. of triethylaluminum, and 0.22 ml. of 5-hexenyltrimethylsilane. The catalyst thus obtained was contacted with propylene under the reaction conditions described in the cited example, to give 40.7 grams of polymer melting at 173° C. with a density of 0.890 gram per cubic centimeter. A second run using 0.5 gram of titanium trichloride, 0.14 ml. of triethylaluminum, and 0.43 ml. of 5-hexenyltrimethylsilane gave the product polymer in a 42.5-gram yield; its melting point was 167° C. and its density was 0.888 gram per cubic centimeter.

(C) A catalyst system was prepared according to the procedure of Example 14A, using 0.5 gram of titanium trichloride, 0.54 ml. of diethylaluminum chloride, and 0.43 ml. of 5-hexenyltrimethylsilane. The catalyst thus obtained was treated with propylene to give a 20.0-gram yield of polymer melting at 175° C. and with a density of 0.908 gram per cubic centimeter. A second run using 0.5 gram of titanium trichloride, 0.26 ml. of diethylaluminum chloride, and 0.86 ml. of 5-hexenyltrimethylsilane gave the product polymer in a 20.0-gram yield; its melting point was 172° C. and its density was 0.890 gram per cubic centimeter.

(D) By the procedure of Example 14A a catalyst was prepared from 0.6 ml. of titanium tetrachloride, 0.49 ml. of triethylaluminum, and 0.37 ml. of 5-hexenyltrimethylsilane. The polymer thus obtained was contacted with ethylene in the manner described in the cited example to give 23.0 grams of product melting at 139° C. with a density of 0.952 gram per cubic centimeter. A second run using 0.6 ml. of titanium tetrachloride, 0.25 ml. of triethylaluminum, and 0.74 ml. of 5-hexenyltrimethylsilane provided the product polymer in a yield of 24.8 grams; the melting point was 123° C. and the density was 0.951 gram per cubic centimeter.

(E) A catalyst system was prepared according to the procedure of Example 14A, using 0.6 ml. of titanium tetrachloride, 0.49 ml. of triethylaluminum, and 0.37 ml. of 5-hexenyltrimethylsilane. The catalyst thus obtained was treated with propylene by the method of the cited example to give 3.8 grams of product polymer melting at 147° C. and with a density of 0.883 gram per cubic centimeter. A second run using 0.6 ml. of titanium tetrachloride, 0.25 ml. of triethylaluminum, and 0.74 ml. of 5-hexenyltrimethylsilane gave similar results (F) By the procedure of Example 14A, a catalyst was prepared using 1.0 gram of titanium tribromide, 0.32 ml. of triethylaluminum, and 0.23 ml. of 5-hexenyltrimethylsilane. The catalyst thus obtained was treated with propylene under the conditions of the cited example to give a small amount of product polymer. A second run using 1.0 gram of titanium tribromide, 0.16 ml. of triethylaluminum, and 0.47 ml. of 5-hexenyltrimethylsilane gave similar results.

(G) A catalyst system was prepared according to the procedure of Example 14A, using 1.0 gram of vanadium trichloride, 0.55 ml. of triethylaluminum, and 0.4 ml. of 5-hexenyltrimethylsilane. The catalyst thus obtained was contacted with ethylene by the procedure of the cited example to give 6.4 grams of product polymer melting at 202° C. and with a density of 0.958 gram per cubic centimeter. A second run using 1.0 gram of vanadium trichloride, 0.26 ml. of triethylaluminum, and 0.8 ml. of 5-hexenyltrimethylsilane gave 3.3 grams of product melting at 218° C. with a density of 0.941 gram per cubic centimeter.

(H) By the procedure of Example 12A, a catalyst system was prepared from 1.0 gram of vanadium trichloride, 0.50 ml. of diethylaluminum chloride, and 0.4 ml. of 5-hexenyltrimethylsilane. The catalyst thus obtained was treated with propylene to give a small amount of polymer. A second run using 1.0 gram of vanadium trichloride, 0.25 ml. of diethylaluminum, and 0.8 ml. of 5-hexenyltrimethylsilane gave similar results.

Example 15.—Phenyltrimethylsilane (A) By the procedure of Example 1, a catalyst system was prepared using 0.5 gram of titanium trichloride, 0.3 ml. of triethylaluminum, and 0.18 ml. of phenyltrimethylsilane. The catalyst thus obtained was treated with ethylene by the procedure of the cited example to give 17.4 grams of polymer melting at 220° C. with a density of 0.941 gram per cubic centimeter. A second run using 0.5 gram of titanium trichloride, 0.15 ml. of triethylaluminum, and 0.36 ml. of phenyltrimethylsilane gave the product polymer in a yield of 20.5 grams; its melting point was 200° C. and its density was 0.934 gram per cubic centimeter.

(B) A catalyst system was prepared according to the procedure of Example 1, using 0.5 gram of titanium trichloride, 0.3 ml. of triethylaluminum, and 0.18 ml. of phenyltrimethylsilane. The resultant mixture was treated with propylene by the method of the cited example to give, after the workup procedure therein described, 54.5 grams of polymer melting at 164° C. with a density of 0.892 gram per cubic centimeter. A second run using 0.5 gram of titanium trichloride, 0.15 ml. of triethylaluminum, and 0.36 ml. of phenyltrimethylsilane gave the polymer in a 39.1-gram yield; its melting point was 158° C. and its density was 0.890 gram per cubic centimeter.

(C) By the procedure of Example 1, a catalyst was prepared from 0.6 ml. of titanium tetrachloride, 0.49 ml. of triethylaluminum, and 0.31 ml. of phenyltrimethylsilane, and then contacted with ethylene. The product polymer weighed 14.7 grams and had a melting point of 208° C. and a density of 0.948 gram per cubic centimeter. A second run using 0.6 ml. of titanium tetrachloride, 0.25 ml. of triethylaluminum, and 0.63 ml. of phenyltrimethylsilane gave the product polymer in a 27.2-gram yield; its melting point was 125° C. and its density was 0.950 gram per cubic centimeter.

(D) A catalyst system was prepared according to the procedure of Example 1, using 0.6 ml. of titanium tetrachloride, 0.5 ml. of triethylaluminum, and 0.31 ml. of phenyltrimethylsilane. The catalyst thus obtained was treated with propylene by the method of the cited example to give a small amount of polymer. A second run using 0.6 ml. of titanium tetrachloride, 0.25 ml. of triethylaluminum, and 0.63 ml. of phenyltrimethylsilane gave similar results.

Example 16.—Diphenyldivinylsilane

By the procedure of Example 1, a catalyst system was prepared using 0.5 gram of titanium trichloride, 0.30 ml. of triethylaluminum, and 0.26 ml. of diphenyldivinylsilane. The catalyst thus obtained was treated with ethylene according to the procedure of the cited example, to give 14.8 grams of polymer melting at 146° C. with a density of 0.945 gram per cubic centimeter. A second run using 0.5 gram of titanium trichloride, 0.15 ml. of triethylaluminum, and 0.52 ml. of diphenyldivinylsilane gave similar results.

Example 17.—Benzyltrimethylsilane (A) A catalyst system was prepared by the procedure of Example 1, using 0.5 gram of titanium trichloride, 0.3 ml. of triethylaluminum, and 0.20 ml. of benzyltrimethylsilane. The mixture thus obtained was treated with ethylene as therein described, to give, after the usual workup procedure, 35.4 grams of polymer melting at 225° C. with a density of 0.932 gram per cubic centimeter. A second run using 0.5 gram of titanium trichloride, 0.14 ml. of triethylaluminum, and 0.41 ml. of benzyltrimethylsilane gave the polymeric product in a yield of 20.0 grams;

its melting point was 137° C. and its density was 0.914 gram per cubic centimeter.

(B) By the procedures of Example 1, a catalyst system was prepared from 0.5 gram of titanium trichloride, 0.3 ml. of triethylsilane, and 0.2 ml. of benzyltrimethylsilane. The resultant catalyst was treated with propylene to give 44.2 grams of polymer melting at 125° C. with a density of 0.891 gram per cubic centimeter. A second run using 0.5 gram of titanium trichloride, 0.14 ml. of triethylaluminum, and 0.4 ml. of benzyltrimethylsilane resulted in a product polymer in 41.8-gram yield; its melting point was 131° C. and its density was 0.884 gram per cubic centimeter.

(C) By the procedure of Example 1, a catalyst system was prepared using 0.5 gram of titanium trichloride, 0.27 ml. of diethylaluminum chloride, and 0.2 ml. of benzyltrimethylsilane. The mixture thus obtained was contacted with propylene to give 15.4 grams of polymer melting at 173° C. with a density of 0.909 gram per cubic centimeter. A second run using 0.5 gram of titanium trichloride, 0.13 ml. of diethylaluminum chloride, and 0.4 ml. of benzyltrimethylsilane provided 12.1 grams of polymer melting at 158° C. with a density of 0.909 gram per cubic centimeter.

(D) A catalyst system was prepared according to the method of Example 1, using 0.6 ml. of titanium tetrachloride, 0.49 ml. of triethylaluminum, and 0.34 ml. of benzyltrimethylsilane. The resultant catalyst was treated with ethylene by the procedure of the cited example to give 24.2 grams of polymer; its melting point was 123° C. and its density was 0.956 gram per cubic centimeter. A second run using 0.6 ml. of titanium tetrachloride, 0.25 ml. of triethylaluminum, and 0.68 ml. of benzyltrimethylsilane gave the product polymer in a yield of 33.1 grams; its melting point was 103° C. and its density was 0.953 gram per cubic centimeter.

(E) By the procedure of Example 1, a catalyst mixture was prepared using 0.6 ml. of titanium tetrachloride, 0.49 ml. of triethylaluminum, and 0.34 ml. of benzyltrimethylsilane. The resultant catalyst was treated with propylene by the method of the cited example to give, after the workup procedure therein described, 1.3 grams of polymer. A second run using 0.6 ml. of titanium tetrachloride, 0.25 ml. of triethylaluminum, and 0.68 ml. of benzyltrimethylsilane gave similar results.

(F) A catalyst system was prepared according to the method of Example 1, using 1.0 gram of titanium tribromide, 0.32 ml. of triethylaluminum, and 0.22 ml. of benzyltrimethylsilane, and the resultant mixture was treated with ethylene by the procedure therein described. The yield of polymer was 3.5 grams; its melting point was 128° C. and its density was 0.947 gram per cubic centimeter. A second run using 1.0 gram of titanium tribromide, 0.16 ml. of triethylaluminum, and 0.44 ml. of benzyltrimethylsilane provided the product polymer in a yield of 3.3 grams; its melting point was 122° C. and its density was 0.943 gram per cubic centimeter.

(G) By the procedure of Example 1, a catalyst mixture was prepared from 1.0 gram of vanadium trichloride, 0.55 ml. of triethylaluminum, and 0.38 ml. of benzyltrimethylsilane. The catalyst thus obtained was treated with ethylene as described in the cited example to give 5.9 grams of polymer melting at 145° C. with a density of 0.950 gram per cubic centimeter. A second run using 1.0 gram of vanadium trichloride, 0.27 ml. of triethylaluminum, and 0.76 ml. of benzyltrimethylsilane gave the product polymer in a 5.7-gram yield; its melting point was 143° C. and its density was 0.930 gram per cubic centimeter.

(H) A catalyst system was prepared according to the method of Example 1, using 1.0 gram of vanadium trichloride, 0.5 ml. of diethylaluminum chloride, and 0.38 ml. of benzyltrimethylsilane. The resultant mixture was treated with propylene by the method of the cited example to give a small amount of polymeric material. A second run using 1.0 gram of vanadium trichloride, 0.25 ml. of triethylaluminum, and 0.76 ml. of benzyltrimethylsilane gave similar results.

Example 18.—Triphenylmethyltrimethylsilane (A) By the procedure of Example 1, a catalyst was prepared using 0.5 gram of titanium trichloride, 0.30 ml. of triethylaluminum, and 0.34 ml. of triphenylmethyltrimethylsilane. The catalyst mixture thus obtained was treated with ethylene according to the method of the cited example to give, after the workup procedure therein described, 28.6 grams of polymer melting at 146° C. and with a density of 0.944 gram per cubic centimeter. A second run using 0.5 gram of titanium trichloride, 0.15 ml. of triethylaluminum, and 0.69 ml. of triphenylmethyltrimethylsilane gave the produce polymer in a 26.4-gram yield; its melting point was 147° C. and its density was 0.936 gram per cubic centimeter.

(B) A catalyst system was prepared according to the procedure described in Example 1, using 0.5 gram of titanium trichloride, 0.30 ml. of triethylaluminum, and 0.34 ml. of triphenylmethyltrimethylsilane. The catalyst mixture thus obtained was treated with propylene to give 55.4 grams of polymer, melting at 162° C. with a density of 0.896 gram per cubic centimeter. A second run using 0.5 gram of titanium trichloride, 0.15 ml. of triethylaluminum, and 0.69 ml. of triphenylmethyltrimethylsilane gave the product polymer in a yield of 55.6 grams; its melting point was 163° C. and its density was 0.909 gram per cubic centimeter.

COMPARATIVE EXAMPLES

Example 19.—Titanium trichloride, triethylaluminum, and n-propyltrimethylsilane (A) By the procedure of Example 1, a control reaction was run using 0.5 gram of titanium trichloride and 0.41 ml. of triethylaluminum as the catalyst. The resultant mixture was contacted with ethylene as described in the cited example to give 15.9 grams of polymer melting at 188° C. with a density of 0.942 gram per cubic centimeter.

(B) The procedure of Example 1 was repeated, using 0.5 gram of titanium trichloride and 0.54 ml. of n-propyltrimethylsilane as a control catalyst system, the monomer was ethylene. The product polymer was obtained in only trace yield.

(C) By the procedure of Example 1, a catalyst system was prepared using 0.5 gram of titanium trichloride, 0.3 ml. of triethylaluminum, and 0.18 ml. of n-propyltrimethylsilane; the relative molar ratios of titanium halide:alkylaluminum:silane was thus 3:2:1. The resultant catalyst was contacted with ethylene by the procedure of the cited example to give 33.1 grams of polymer melting at 230° C. with a density of 0.935 gram per cubic centimeter. Comparison with the yields noted in Examples 19A and 19B show that partial molar replacement of the triethylaluminum with the n-propyltrimethylsilane results in a more-than-additive increase in yield.

Example 20.—Titanium trichloride triethylaluminum, and allyltrimethylsilane (A) By the procedure of Example 1, a control catalyst system was prepared from 0.5 gram of titanium trichloride and 0.44 ml. of triethylaluminum. The mixture thus obtained was treated with propylene by the procedure of the cited example to give 35.1 grams of polymer, melting at 156° C. and with a density of 0.852 gram per cubic centimeter.

(B) A catalyst system was prepared according to the procedure of Example 1, using 0.5 gram of titanium trichloride and 0.32 ml. of allyltrimethylsilane. Treatment of the resultant catalyst with propylene by the method of the cited example provided the polymeric product in a yield of 0.2 gram.

(C) By the procedure of Example 1 a catalyst system was prepared using 0.5 gram of titanium trichloride, 0.14 ml. of triethylaluminum, and 0.32 ml. of allyltrimethylsilane. Treatment of the resultant mixture with propylene by the procedure of the cited example provided 44.2 grams of polymer. Thus a partial replacement of the alkylaluminum component of the control catalyst resulted in a surprising increase in polymer yield.

Example 21.—Titanium trichloride, triethylaluminum and 3-butenyltrimethylsilane (A) By the procedure of Example 1, a catalyst system was prepared from 0.5 gram of titanium trichloride and 0.41 ml. of triethylaluminum, and subsequently contacted with ethylene. The product polymer, after the workup procedure of the cited example weighed 21.5 grams; its melting point was 156° C. and its density was 0.938 gram per cubic centimeter.

(B) A catalyst system was prepared according to the procedure of Example 1, using 0.5 gram of titanium trichloride and 1.5 ml. of 3-butenyltrimethylsilane. Treatment of the resultant mixture with ethylene gave a product polymer in trace yield.

(C) By the procedure of Example 1, a catalyst was prepared from 0.5 gram of titanium trichloride, 0.15 ml. of triethylaluminum, and 0.38 ml. of 3-butenyltrimethylsilane. Treatment of the resultant catalyst with ethylene gave polymer in a yield of 27.8 grams. Its melting point was 142° C. and its density was 0.933 gram per cubic centimeter. Thus the partial replacement of triethylaluminum by 3-butenyltrimethylsilane results in increased yield over the use of either 3-butenyltrimethylsilane or triethylaluminum alone as cocatalyst.

Example 22.—Titanium trichloride, triethylaluminum, and 4-pentenyltrimethylsilane (A) By the procedure of Example 1, a catalyst system control was prepared from 0.5 gram of titanium trichloride and 0.44 ml. of triethylaluminum, and subsequently contacted with propylene under the conditions therein described. The polymer yield was 42.3 grams; its melting point was 129° C. and its density was 0.893 gram per cubic centimeter.

(B) A catalyst system was prepared using 0.5 gram of titanium trichloride and 0.61 ml. of 4-pentenyltrimethylsilane, by the procedure of Example 1. Treatment of the mixture thus obtained with propylene gave a product polymer in trace yield.

(C) By the procedure of Example 1, a catalyst system was prepared using 0.5 gram of titanium trichloride, 0.3 ml. of triethylaluminum, and 0.20 ml. of 4-pentenyltrimethylsilane. Treatment of the resultant mixture with propylene by the method of the cited example gave, after the workup procedure therein described, 61.8 grams of polymer melting at 167° C. with a density of 0.889 gram per cubic centimeter. Thus the use of the three-component catalyst provided the polymer in a substantially increased yield over either of the two catalyst systems of Example 22A and 22B.

Example 23.—Titanium tetrachloride, triethylaluminum, and 4-pentenyltrimethylsilane (A) By the procedure of Example 1, a catalyst system was prepared using 0.6 ml. of titanium tetrachloride and 0.74 ml. of triethylaluminum. Treatment of the mixture thus obtained with ethylene gave 21.0 grams of polymer melting at 200° C. with a density of 0.890 gram per cubic centimeter.

(B) A catalyst system was prepared using 0.6 ml. of titanium tetrachloride and 1.03 ml. of 4-pentenyltrimethylsilane. Treatment of the resultant mixture with ethylene according to the method of Example 1 gave polymer in trace yield.

(C) By the procedure of Example 1, a catalyst system was prepared from 0.6 ml. of titanium tetrachloride, 0.25 ml. of triethylaluminum, and 0.68 ml. of 4-pentenyltrimethylsilane. Treatment of the catalyst thus obtained with ethylene by the method of the cited example gave 26.7 grams of polymer, melting at 128° C. with a density of 0.940 gram per cubic centimeter. Thus, the three-component catalyst gave the polymeric product in superior yield.

Example 24.—Titanium trichloride, triethylaluminum, and 5-hexenyltrimethylsilane (A) By the procedure of Example 1, a catalyst was prepared as control using 0.5 gram of titanium trichloride and 0.44 ml. of triethylaluminum. Treatment of the mixture thus obtained with propylene gave 31.5 grams of polymer melting at 159° C. with a density of 0.890 gram per cubic centimeter.

(B) A catalyst system was prepared according to the method of Example 1, using 0.5 gram of titanium trichloride and 0.66 ml. of 5-hexenyltrimethylsilane. Treatment of the resultant mixture with propylene gave a trace of polymer.

(C) By the procedure of Example 1, a catalyst was prepared using 0.5 gram of titanium trichloride, 0.14 ml. of triethylaluminum, and 0.43 ml. of 5-hexenyltrimethylsilane. Treatment of the mixture thus obtained with propylene gave, after the usual workup procedure, 42.5 grams of polymer melting at 167° C. with a density of 0.888 gram per cubic centimeter. Thus, the use of the three-component system gave substantially increased polymer yield.

Example 25.—Titanium trichloride, diethylaluminum chloride, and 5-hexenyltrimethylsilane (A) By the procedure of Example 1, a catalyst control was prepared using 0.5 gram of titanium trichloride and 0.82 ml. of diethylaluminum chloride. Treatment of the resultant mixture with propylene gave, after the usual workup procedure, 14.1 grams of polymer melting at 171° C. with a density of 0.914 gram per cubic centimeter.

(B) A catalyst system was prepared according to the procedure of Example 1, using 0.5 grams of titanium trichloride and 0.66 ml. of 5-hexenyltrimethylsilane. Treatment of the resultant mixture with propylene gave a trace yield of polymer.

(C) By the procedure of Example 1, a catalyst system was prepared using 0.5 gram of titanium trichloride, 0.54 ml. of diethylaluminum chloride, and 0.43 ml. of 5-hexenyltrimethylsilane. Treatment of the catalyst thus obtained with propylene gave a polymeric product in a yield of 20.0 grams. The product melted at 175° C. and had a density of 0.908 gram per cubic centimeter. Thus the use of the three-component system resulted in increased yield over that of the controls.

Example 26.—Titanium trichloride, triethylaluminum, and phenyltrimethylsilane (A) By the procedure of Example 1, a catalyst control was prepared using 0.5 gram of titanium trichloride and 0.41 ml. of triethylaluminum. Treatment of the mixture thus obtained with ethylene gave, after the usual workup procedure 15 grams of polymer melting at 180° C. with a density of 0.942 gram per cubic centimeter.

(B) A catalyst system was prepared according to the procedure of Example 1, using 0.5 gram of titanium trichloride and 0.57 ml. of phenyltrimethylsilane. Treatment of the catalyst thus obtained with ethylene gave polymer in trace yield.

(C) By the procedure of Example 1, a catalyst was prepared from 0.5 gram of titanium trichloride, 0.15 ml. of triethylaluminum, and 0.36 ml. of phenyltrimethylsilane. Treatment of the mixture thus obtained with ethylene gave, after the usual workup procedure, 20.5 grams of polymer melting at 200° C. with a density of 0.934 gram per cubic centimeter. Thus the three-component system provided the polymer in greater yield than either of the two-component controls.

Example 27.—Titanium tetrachloride, triethylaluminum, and benzyltrimethylsilane (A) By the procedure of Example 1, a catalyst system was prepared using 0.6 ml. of titanium tetrachloride and 0.74 ml. of triethylaluminum. Treatment of the mixture thus obtained with ethylene gave, after the workup procedure of the cited example, 22.6 grams of polymer melting at 133° C. with a density of 0.924 gram per cubic centimeter.

(B) A catalyst system was prepared according to the procedure of Example 1, using 0.6 ml. of titanium tetrachloride and 1.03 ml. of benzyltrimethylsilane. Treatment of the resultant mixture with ethylene gave, after the usual workup procedure, a trace of polymer.

(C) By the procedure of Example 1, a catalyst system was prepared using 0.6 ml. of titanium tetrachloride, 0.25 ml. of triethylaluminum, and 0.68 ml. of benzyltrimethylsilane. Treatment of the resultant mixture with ethylene gave 33.1 grams of polymer melting at 103° C. with a density of 0.953 gram per cubic centimeter. Thus the three-component catalyst proved superior to either of the two-component control systems.

It will be evident that modifications of this invention can be made without departing from the spirit and scope of this disclosure or the scope of the following claims.

We claim:

1. As a composition of matter, a catalyst which consists of titanium trichloride, triethylaluminum, and n-propyltrimethylsilane.

2. As a composition of matter, a catalyst which consists of titanium trichloride, triethylaluminum, and phenyltrimethylsilane.

3. As a composition of matter, a catalyst which consists of titanium trichloride, triethylaluminum, and benzyltrimethylsilane.

4. As a composition of matter, a catalyst which consists of titanium trichloride, triethylaluminum, and triphenylmethyltrimethylsilane.

References Cited

FOREIGN PATENTS

| 526,101 | 5/1955 | Italy. |
| 1,243,069 | 8/1960 | France. |
| 830,424 | 3/1960 | Great Britain. |
| 886,085 | 1/1962 | Great Britain. |

OTHER REFERENCES

Chem. Abstracts 55: 7329e (1961).
Chem. Abstracts 58: 8047c (1963).

JOSEPH L. SCHOFER, *Primary Examiner.*

M. KURTZMAN, *Assistant Examiner.*

U.S. Cl. X.R.

260—88.2, 91.1, 80.78, 89.5, 94.9, 92.8, 94.3, 89.1, 93.5, 88.3, 93.1, 93.7, 92.3